United States Patent [19]
Pascucci

[11] Patent Number: 5,914,867
[45] Date of Patent: *Jun. 22, 1999

[54] VOLTAGE GENERATOR-BOOSTER FOR SUPPLYING A PULSATING VOLTAGE HAVING APPROXIMATELY CONSTANT VOLTAGE LEVELS

[75] Inventor: Luigi Pascucci, Sesto San Giovanni, Italy

[73] Assignee: SGS-Thomson Microelectronics S.r.l., Agrate Brianza, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/631,574

[22] Filed: Apr. 12, 1996

[30] Foreign Application Priority Data

Apr. 14, 1995 [EP] European Pat. Off. ............. 95830153

[51] Int. Cl.$^6$ .................................................. H02M 7/25
[52] U.S. Cl. .............................................................. 363/60
[58] Field of Search .............................. 363/59, 60, 61, 363/62, 50, 53

[56] References Cited

U.S. PATENT DOCUMENTS

| | | | |
|---|---|---|---|
| 5,051,882 | 9/1991 | Grimm et al. | 363/60 |
| 5,132,895 | 7/1992 | Kase | 363/60 |
| 5,387,882 | 2/1995 | Schoofs | 331/111 |
| 5,392,205 | 2/1995 | Zavaleta | 363/59 |
| 5,410,465 | 4/1995 | Tan | 363/60 |
| 5,436,821 | 7/1995 | Inoue | 363/60 |
| 5,442,586 | 8/1995 | Javanifard et al. | 365/185 |
| 5,513,091 | 4/1996 | Uchida et al. | 363/60 |
| 5,546,296 | 8/1996 | Savignac et al. | 363/60 |
| 5,566,059 | 10/1996 | Tan | 363/60 |
| 5,581,455 | 12/1996 | Rossi et al. | 363/60 |
| 5,587,960 | 12/1996 | Ferris | 365/189.02 |
| 5,604,671 | 2/1997 | Okamura | 363/60 |
| 5,635,776 | 6/1997 | Imi | 363/60 |
| 5,666,276 | 9/1997 | Hirata | 363/60 |
| 5,680,300 | 10/1997 | Szepesi et al. | 363/62 |
| 5,694,308 | 12/1997 | Cave | 363/59 |
| 5,708,387 | 1/1998 | Cleveland et al. | 327/536 |
| 5,768,115 | 6/1998 | Pascucci et al. | 363/59 |
| 5,808,883 | 9/1998 | Hawkes | 363/60 |
| 5,831,845 | 11/1998 | Zhou et al. | 363/60 |

FOREIGN PATENT DOCUMENTS

| | | | |
|---|---|---|---|
| A-0 257 810 | 3/1988 | European Pat. Off. | H02M 3/07 |
| A-0 382 929 | 8/1990 | European Pat. Off. | G05F 3/20 |
| A-0 638 984 | 2/1995 | European Pat. Off. | H02M 3/07 |

*Primary Examiner*—Peter S. Wong
*Assistant Examiner*—Derek J. Jardieu
*Attorney, Agent, or Firm*—Wolf, Greenfield & Sacks, P.C.

[57] ABSTRACT

A generator-booster includes a bootstrap capacitor coupled between an output node and a pull-up node. A bootstrap control stage is coupled to the pull-up node and receives a pump signal with two states determining a precharge step and a pull-up step of the bootstrap capacitor. A precharge limiting transistor is supplied with a precharge reference signal and is coupled to the output node and the bootstrap capacitor to prevent a bootstrap capacitor from being charged in excess of a value determined by the precharge reference signal. A limiting stage is coupled to the output node and the bootstrap capacitor to prevent a voltage of the output node from exceeding a value determined by the limiting stage. The bootstrap control stage also provides for decoupling the pull-up node from the pump signal during the pull-up step, after the limiting stage has been turned on.

42 Claims, 2 Drawing Sheets

VOLTAGE GENERATOR-BOOSTER FOR SUPPLYING A PULSATING VOLTAGE HAVING APPROXIMATELY CONSTANT VOLTAGE LEVELS

BACKGROUND OF THE INVENTION

1. Field of the Invention

The present invention relates to a voltage generator-booster for supplying a pulsating voltage having approximately constant voltage level.

2. Discussion of the Related Art

Integrated circuits currently demand voltage levels that remain substantially constant despite a variation in supply voltage. The voltage levels may be higher than the supply voltage, in which case a voltage generator (booster) for increasing the supply voltage is called for, or the voltage levels may be lower, in which case the voltage generator provides for limiting the supply voltage. Generation of the high voltage is important, for example, in the case of nonvolatile memories with a 3 V supply voltage, the cells of which must therefore be read at a higher gate voltage; whereas, in the presence of a high supply voltage, this must be limited to prevent the reading of programmed cells.

If a circuit capable of operating at both high and low supply voltages is required, with a voltage generator for supplying an approximately constant voltage level despite a variation in supply voltage, the generator must be capable of operating as both a voltage booster and limiter, depending on the supply voltage.

At present, known voltage boosters include a charge pump circuit which, in turn, includes a bootstrap capacitor and a pull-up circuit which operates in two states. The first state precharges the capacitor to roughly the supply voltage, where a first terminal of the capacitor is grounded and a second terminal is connected to the supply voltage. In the second state, the first terminal of the capacitor is pulled up to the supply voltage, and the second terminal (which is therefore at nearly twice the supply voltage) is connected to an output. Even though the actual output voltage depends on the charge distribution between the bootstrap capacitor and the capacitance of the load supplied by the booster, so that the final output voltage is less than twice the supply voltage, the output voltage of known boosters is highly dependent on supply voltage, thus preventing the known boosters from being employed in devices operating within a wide range of different supply voltages, e.g., 3 to 7 V.

SUMMARY OF THE INVENTION

It is an object of the present invention to provide a voltage generator-booster for supplying, despite a variation in supply voltage, an approximately constant voltage level either higher or lower than the supply voltage itself.

According to the present invention, there is provided a voltage generator-booster for supplying an approximately constant voltage level with a bootstrap capacitor having a first terminal coupled to a first reference potential line and a second terminal connected to a pull-up node. A bootstrap control stage is connected to the pull-up node and receives a pump signal $V_{PN}$ which switches between two different states defining a precharge state and a pull-up state of the bootstrap capacitor. A precharge limiting means is connected to the first terminal of the bootstrap capacitor and is supplied with a precharge reference signal $V_{UP}$ which limits the charge of the bootstrap capacitor to a limitation value related to the precharge reference signal during the precharge state. A limiting stage is connected to the first terminal of the bootstrap capacitor and limits a potential at the first terminal of the bootstrap capacitor during the pull-up state. A pulse amplitude preset stage generates the precharge reference signal $V_{UP}$, and a turn on reference signal $V_{LC}$ which is supplied to the limiting stage.

BRIEF DESCRIPTION OF THE DRAWINGS

A preferred, non-limiting embodiment of the present invention will be described by way of example with reference to the accompanying drawings, in which.

DETAILED DESCRIPTION

Figure 1:
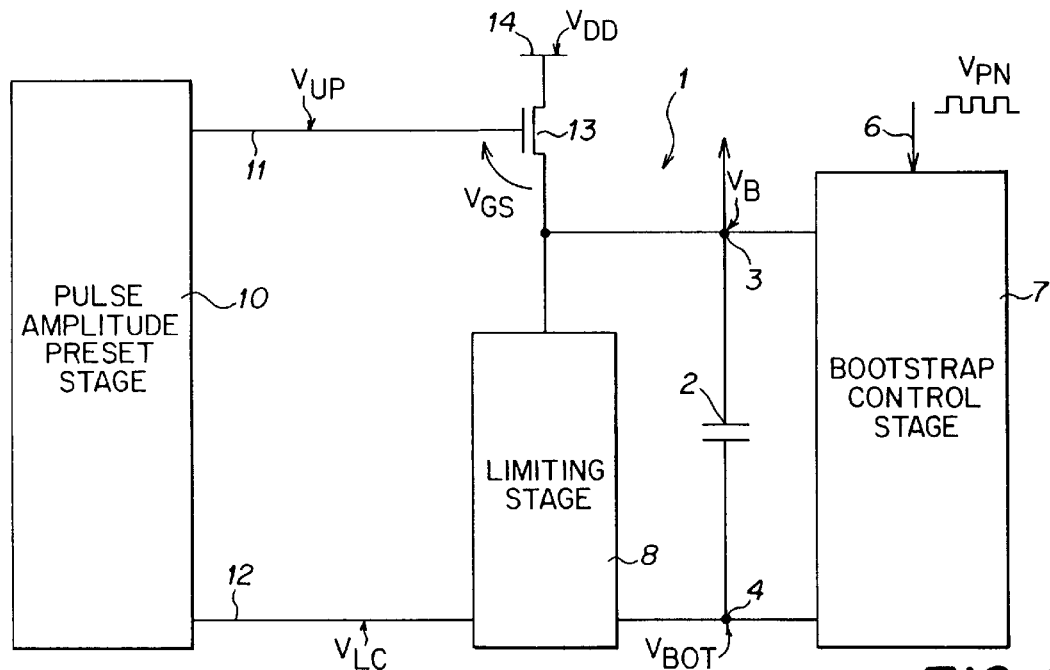
FIG. 1 shows a block diagram of the generator-booster according to the present invention.

The voltage generator-booster 1 as shown in FIG. 1 includes a bootstrap capacitor 2 having first and second terminals 3, 4. Terminal 3 defines an output node presenting bootstrap voltage $V_B$ and terminal 4 defines a pull-up node which is brought alternately to low and high voltage, control voltage $V_{BOT}$, during precharge and pull-up. Nodes 3 and 4 are connected to a bootstrap control stage 7 for controlling the pull-up of node 4 and hence of output node 3. An input terminal 6 of the bootstrap control stage 7 is supplied with a pump signal $V_{PN}$ which oscillates between 0 V and a supply voltage $V_{DD}$, and which determines the precharge and pull-up sequence of capacitor 2.

A limiting stage 8 is connected to nodes 3 and 4, and cooperates with bootstrap control stage 7 so as to lock bootstrap voltage $V_B$ at output node 3 in a controlled manner and at a predetermined value, and block the pull-up of node 4 by bootstrap control stage 7 when limiting stage 8 is turned on during pull-up. Blocking is preferably achieved by disconnecting voltage $V_{BOT}$ at node 4 during pull-up, and locking it to voltage $V_B$ at output node 3, so that the limiting of voltage $V_B$ automatically also limits voltage $V_{BOT}$.

A pulse amplitude preset stage 10 provides a precharge reference voltage $V_{UP}$ and a turn-on reference voltage $V_{LC}$ for, respectively, determining a precharge voltage of bootstrap capacitor 2 during precharge and a turn-on value of limiting stage 8. As shown in FIG. 1, pulse amplitude preset stage 10 presents two output terminals 11 and 12 presenting the precharge reference voltage $V_{UP}$ and the turn-on reference voltage $V_{LC}$, respectively. Output terminals 11, 12 are, respectively, connected to a gate terminal of a MOS transistor 13 and to limiting stage 8.

As can be seen in FIG. 1, transistor 13 is interposed between output node 3 and a supply line 14 at supply voltage $V_{DD}$, so as to permit charging of bootstrap capacitor 2 during the precharge state. Transistor 13 couples output node 3 to supply voltage $V_{DD}$ and provides for limiting the precharge voltage of the bootstrap capacitor 2 to a value set by precharge reference voltage $V_{UP}$, minus a voltage drop $V_{GS}$ between the source and gate terminals of transistor 13.

The transistor 13 is turned off during pull-up so as to disconnect output node 3 from the supply line 14.

Operation of generator-booster 1, as shown in FIG. 1, will now be described. During the precharge state determined by a high value, equal to the supply voltage $V_{DD}$, of pump signal $V_{PN}$, pull-up node 4 is maintained at a low control voltage, $V_{BOT}=0$ V, to enable bootstrap capacitor 2 to be charged to the value set by precharge reference voltage $V_{UP}$ minus $V_{GS}$. Typically, precharge reference voltage $V_{UP}$ is roughly 3 V, and bootstrap voltage $V_B$ at output node 3 during precharge is roughly 2 V.

During pull-up, as pump signal $V_{PN}$ falls to ground voltage (0 V), this is accompanied by an increase in control voltage $V_{BOT}$ at pull-up node 4 and hence in bootstrap voltage $V_B$ at output node 3. Upon control voltage $V_{BOT}$ at pull-up node 4 reaching a predetermined value set by turn-on reference voltage $V_{LC}$, limiting stage 8 is turned on to lock bootstrap voltage $V_B$ and block pull-up of node 4 by bootstrap control stage 7, so that bootstrap voltage $V_B$ is locked to the value determined by limiting stage 8. Typically, turn-on reference voltage $V_{LC}$ is roughly 1.5 V and the turn-on voltage of limiting stage 8, control voltage $V_{BOT}$, ranges from roughly 2.5 to 3 V. Bootstrap voltage $V_B$, during pull-up, ranges from roughly 3.9 to 4.6 V, depending on supply voltage $V_{DD}$.

In other words, bootstrap voltage $V_B$ is basically limited in two ways: by preventing bootstrap capacitor 2 from being charged to a high level; and by preventing output node 3 from exceeding the predetermined value. In addition to which, pull-up node 4 is limited by being disconnected from the pumping action of signal $V_{PN}$ so as to prevent unnecessary power consumption.

Figure 2:
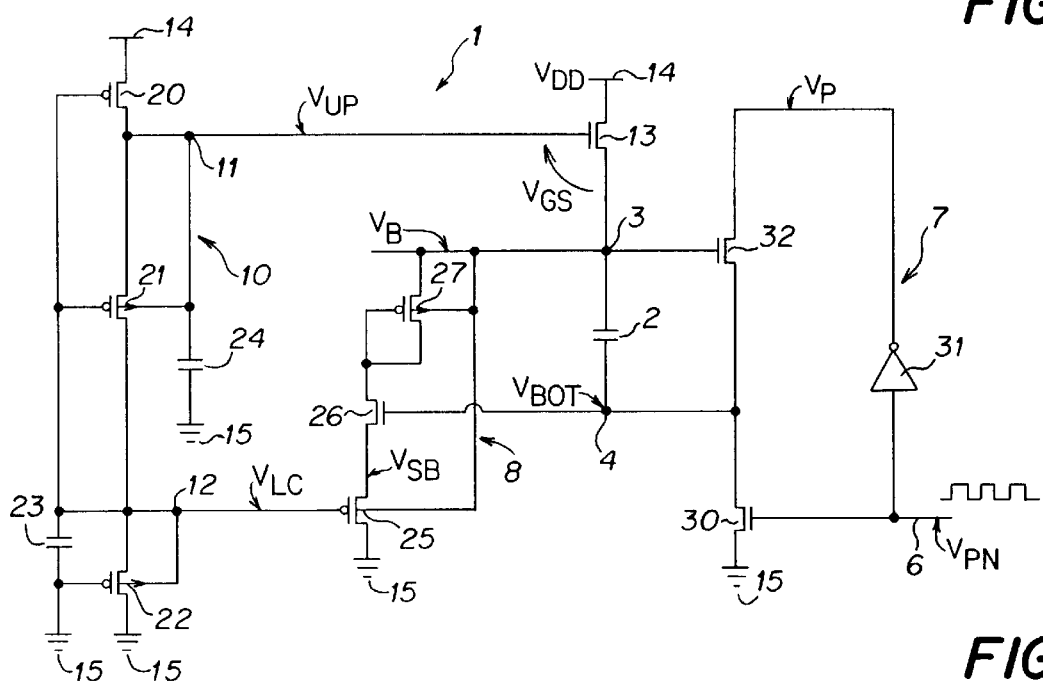
FIG. 2 shows a simplified circuit diagram of the FIG. 1 generator-booster.
Figure 3:
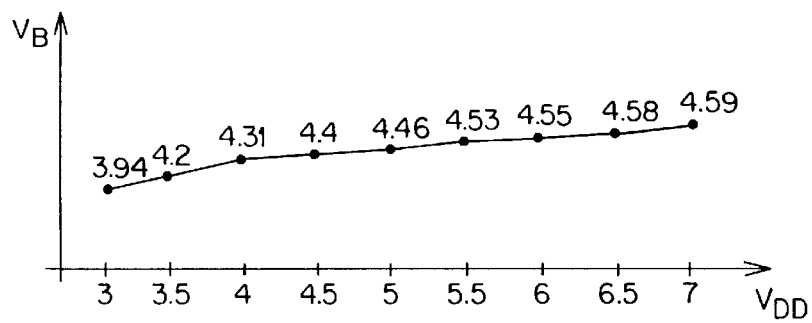
FIG. 3 shows a graph of the output voltage of the FIG. 2 generator-booster against a variation in supply voltage.

FIG. 2 shows one embodiment of the generator-booster as shown in FIG. 1.

As shown in FIG. 2, pulse amplitude preset stage 10 includes a series connection of three P-channel transistors 20, 21, 22 between the supply line 14 and a ground line 15. More specifically, transistor 20 is a resistive type, having a low width/length (W/L) ratio, with a source terminal connected to the supply line 14, a drain terminal defining the output terminal 11 of the pulse amplitude preset stage 10, and a gate terminal connected to preset stage output terminal 12.

Transistor 21 is a diode-connected native transistor with no alteration in a threshold voltage during fabrication, and therefore presents a high threshold voltage, with a source terminal connected to output terminal 11, and drain and gate terminals connected to each other and to output terminal 12. Transistor 22 is also a diode-connected native transistor with a source terminal connected to output terminal 12, and gate and drain terminals connected to each other and to the ground line 15. A capacitor 23, 0.05 pF in one embodiment, is connected between ground line 15 and output terminal 12. A body region of transistor 22 is connected to output terminal 12. As shown in FIG. 2, the body region of transistor 21 is connected to output terminal 11 and, via a capacitor 24 of, say, 0.5 pF, to ground line 15.

Limiting stage 8, as shown in FIG. 2, includes a P-channel MOS transistor 25 with a drain terminal connected to ground line 15, a gate terminal connected to output terminal 12, and a source terminal connected to a source terminal of an N-channel transistor 26 presenting voltage $V_{SB}$. A gate terminal of transistor 26 is connected to pull-up node 4, and a drain terminal is connected to a drain terminal of a diode-connected P-channel transistor 27. A gate terminal and the drain terminal of transistor 27 are connected to one another, and a source terminal is connected to output node 3. Body regions of transistors 25 and 27 are both connected to output node 3.

Further, transistor 13 is an N-channel native transistor with a low threshold voltage; and the bootstrap capacitor 2 is 2 pF in one embodiment.

Bootstrap control stage 7 includes an N-channel transistor 30 with a source terminal connected to ground line 15, a gate terminal connected to input terminal 6, and a drain terminal connected to pull-up node 4. Further, control stage 7 includes an inverter 31 with an input connected to input terminal 6, and an output connected to a drain terminal of a low-threshold N-channel native transistor 32 having a gate terminal connected to output node 3, and a source terminal connected to pull-up node 4. The output of inverter 31, therefore, presents an inverted pump signal $V_P$, opposite to pump signal $V_{PN}$ at input terminal 6.

The generator-booster 1, as shown in FIG. 2, operates as follows. When pump signal $V_{PN}$ is high, transistor 30 is on and keeps pull-up node 4 grounded; at the same time, the output of inverter 31 is low ($V_P=0$ V) and transistor 32 is off. Pulse amplitude preset stage output terminal 12 presents a voltage $V_{LC}$ of roughly 1.5 V given by the voltage drop across the gate and source terminals of transistor 22. Pulse amplitude preset stage output terminal 11 presents a voltage $V_{UP}$ of roughly 3 V given by a sum of $V_{LC}$ and a voltage drop across the gate and source terminals of transistor 21. Transistor 13 is on, thus permitting capacitor 2 to be charged to the specified $V_{UP}$ value minus $V_{GS}$, i.e., to roughly 2 V, which therefore also represents the value of voltage $V_B$ during precharging. Limiting stage 8 is off, by virtue of the voltage $V_{BOT}$ at the gate terminal of transistor 26 being lower than the voltage $V_{SB}$ at the source terminal of transistor 26, so that transistor 26 is off.

When pump signal $V_{PN}$ switches to low and the inverted signal $V_P$ increases, the control voltage $V_{BOT}$ at pull-up node 4 also begins increasing, "drawn" by transistor 32 which has come on; and, at the same time, bootstrap voltage $V_B$ also increases. Upon control voltage $V_{BOT}$ reaching a value specified by turn-on reference voltage $V_{LC}$ plus a difference in potential between the drain and gate terminals of transistor 25, and a difference in potential between the gate and source terminals of transistor 26, total 2.5 to 3 V, transistor 26 comes on, thus turning on limiting stage 8 which limits the voltage $V_B$ at output node 3 to a value equal to a sum of the voltage drops across transistors 25–27. This value varies little compared to changes in supply voltage $V_{DD}$: between 3.94 V when $V_{DD}=3$ V, and 4.59 V when $V_{DD}=7$ V.

Limiting of bootstrap voltage $V_B$ automatically results in limiting of control voltage $V_{BOT}$ via transistor 32 which, despite even a high increase in inverted pump voltage $V_P$ (to 7 V in the case of a 7 V supply voltage), prevents the source terminal from following the course of the drain voltage. Limiting and blocking control voltage $V_{BOT}$ at the gate terminal of transistor 26 confirms the limiting action of limiting stage 8, so that bootstrap voltage $V_B$ is blocked to the predetermined value.

In the circuit as shown in FIG. 2, the limiting voltage imposed by limiting stage 8 depends both on the turn-on value $V_{LC}$ imposed by pulse amplitude preset stage 10, and on the voltage values of transistors 25–27, so that a maximum value of bootstrap voltage $V_B$ may be adjusted by simply acting on turn-on reference voltage $V_{LC}$.

Figure 4:
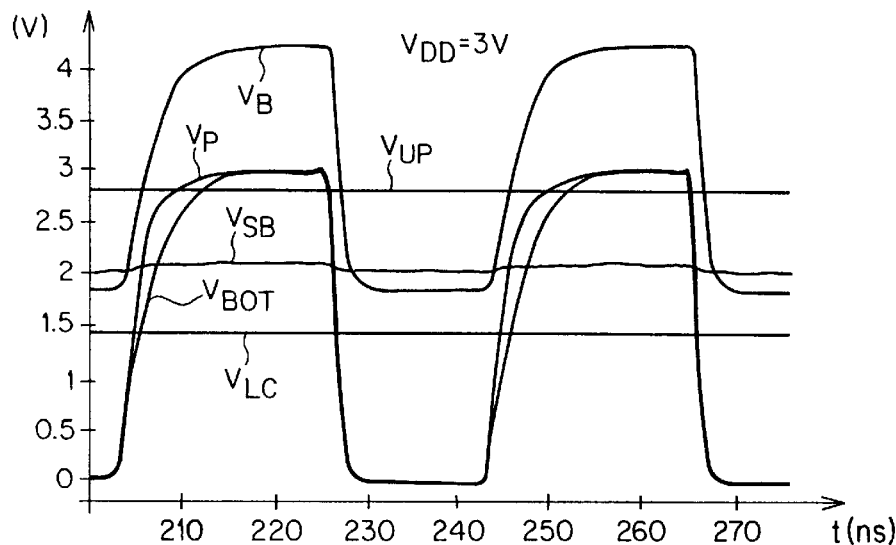
FIGS. 4 to 6 show plots of voltages measured at nodes of the FIG. 2 diagram, for three different supply voltage values.
Figure 5:
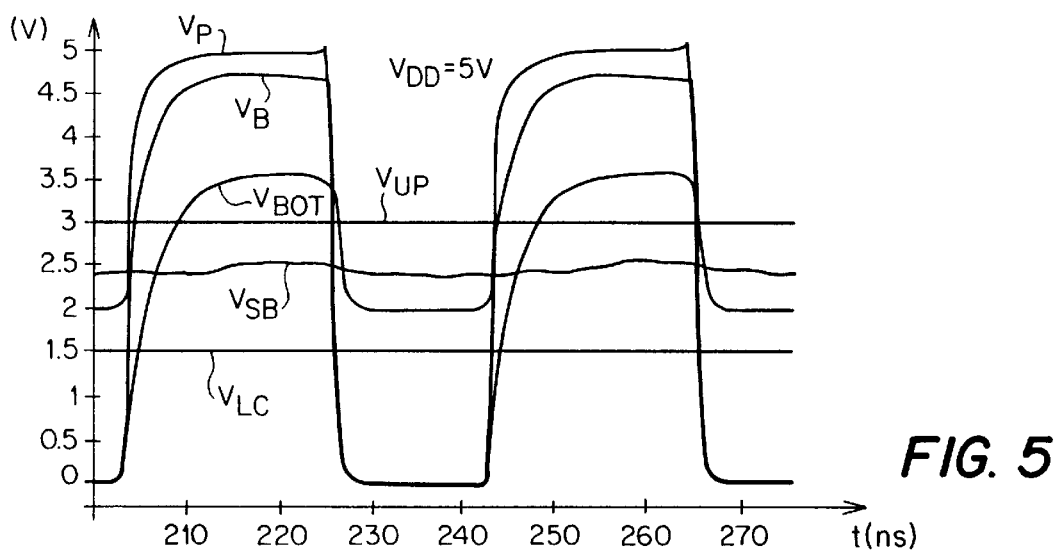
Figure 6:
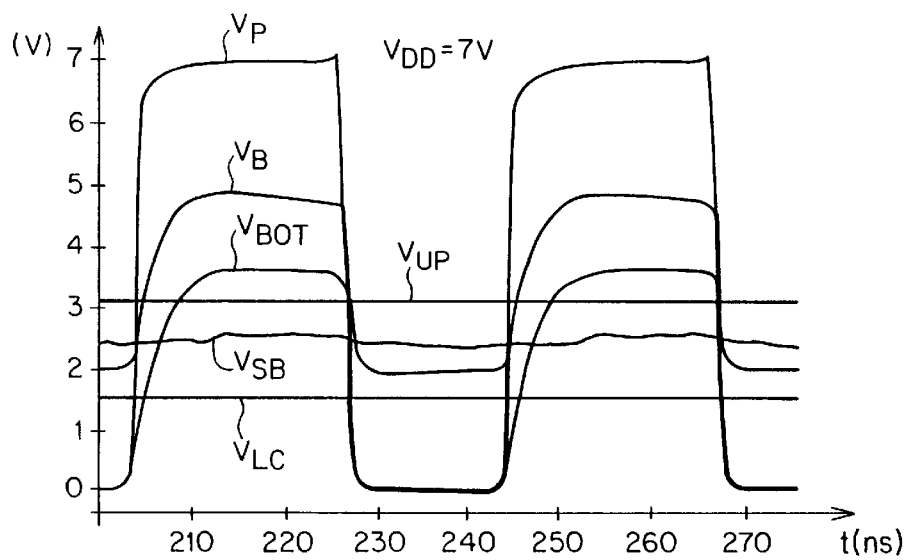

FIGS. 4–6 show graphs of voltages $V_P$ $V_{BOT}$, $V_B$, $V_{SB}$, $V_{LC}$, and $V_{UP}$ in the circuit shown in FIG. 2 for three different supply voltage $V_{DD}$ values, 3 V, 5 V and 7 V, respectively. Each graph shows a gradual, nonimpulsive pattern of the voltages due to the delays involved; the gradual turn-on of the various components; the very small variation in bootstrap voltage $V_B$ in each case; and the manner in which bootstrap voltage $V_B$ differs in each case in relation to inverted pump voltage $V_P$. As shown in FIGS.

4–6, bootstrap voltage $V_B$ is higher than the inverted pump voltage $V_P$ when the supply voltage $V_{DD}$ is a low value (3 V), is only slightly lower than the inverted pump voltage $V_P$ when the supply voltage $V_{DD}$ is an intermediate value (5 V), and differs considerably from the inverted pump voltage $V_P$ when the supply voltage $V_{DD}$ is a high value (7 V).

The advantages of the voltage generator-booster described are as follows. Firstly, as shown, the voltage generator-booster provides for supplying a bootstrap voltage that varies very little, even in the presence of widely differing supply voltages. Secondly, the generator-booster provides for considerably reducing consumption, in that the only part supplied with current is the pulse amplitude preset stage 10 via resistive transistor 20, which draws different current levels depending on the supply voltage. The other stages in fact consume and are supplied with no current, except for small capacitive peaks when switching from one state to the other. Thirdly, the voltage generator-booster is extremely straightforward in design, is reliable, and is easy to integrate. And fourthly, the bootstrap, turn-on and limiting voltage values may be set as required by simply sizing the transistors accordingly, or using different types of transistors, e.g., other than native.

Clearly, changes may be made to the generator-booster as described and illustrated herein without, however, departing from the scope of the present invention. For example, the FIG. 1 stages may be formed differently from those shown in FIG. 2, providing they each perform the functions as indicated. Changes may be made to the components shown, using other than native transistors for the references, or other elements capable of ensuring predetermined voltages. The capacitors may be formed using integrated capacitors, appropriately connected MOS transistors, or any existing technique. Changes also may be made to the component and voltage values shown, which are purely indicative.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A voltage generator-booster for supplying an output voltage at one of a first and second approximately constant voltage level, the generator-booster comprising:

a bootstrap capacitor with a first terminal coupled to a first reference terminal to receive a first reference potential, and a second terminal coupled to a pull-up node, the output voltage provided at the first terminal of the bootstrap capacitor;

a bootstrap control stage coupled to the pull-up node and having a pump input terminal to receive a pump signal $V_{PN}$ switchable between a first level defining a precharge state of the bootstrap capacitor to provide the output voltage at the first approximately constant voltage level and a second level defining a pull-up state of the bootstrap capacitor to provide the output voltage at the second approximately constant voltage level, the bootstrap control stage providing a switching voltage, in response to the pump signal $V_{PN}$, to the pull-up node;

precharge limiting means, coupled to the first terminal of the bootstrap capacitor, for receiving a precharge reference signal $V_{UP}$ and for limiting a charge of the bootstrap capacitor in the precharge state to a limitation value related to the precharge reference signal and that varies little with respect to variations of the first reference potential; and a limiting stage, coupled to the first terminal of the bootstrap capacitor, that limits a potential at the first terminal of the bootstrap capacitor in the pull-up state.

2. The voltage generator-booster as recited in claim 1, wherein the pump input terminal is coupled to the pull-up node and the bootstrap control stage comprises decoupling means, disposed between the pump input terminal and the pull-up node, for decoupling the pump input terminal from the pull-up node when the pull-up node reaches a predetermined voltage value.

3. The voltage generator-booster as recited in claim 1, wherein the precharge limiting means comprises:

a precharge transistor having a first terminal coupled to the first reference terminal, a second terminal coupled to the first terminal of the bootstrap capacitor, and a control terminal to receive the precharge reference signal $V_{UP}$.

4. The voltage generator-booster as recited in claim 3, wherein the precharge transistor is a native MOS transistor.

5. The voltage generator-booster as recited in claim 1, wherein the bootstrap control stage comprises:

first and second decoupling transistors coupled together to operate in a push-pull manner, the first decoupling transistor being coupled to the second terminal of the bootstrap capacitor and a second reference terminal to receive a second reference potential line and having a first control terminal coupled to the pump input terminal, the second decoupling transistor being coupled to the pump input terminal and the second terminal of the bootstrap capacitor and having a second control terminal coupled to the first terminal of the bootstrap capacitor.

6. The voltage generator-booster as recited in claim 5, wherein the first and second decoupling transistors are of a same type; and wherein the bootstrap control stage further includes an inverting element coupled to the pump input terminal and the second decoupling transistor.

7. The voltage generator-booster as recited in claim 6, wherein the first and second decoupling transistors are N-channel MOS transistors.

8. The voltage generator-booster as recited in claim 1, further comprising a pulse amplitude preset stage that generates the precharge reference signal $V_{UP}$ supplied to the precharge limiting means and a turn-on reference signal $V_{LC}$ supplied to the limiting stage.

9. The voltage generator-booster as recited in claim 8, wherein the limiting stage comprises:

a limiting circuit coupled between the first terminal of the bootstrap capacitor and a second reference terminal to receive a second reference potential;

an input terminal to receive the turn-on reference signal $V_{LC}$; and a turn-on element, coupled to the limiting circuit, to turn on the limiting circuit when a voltage at the second terminal of the bootstrap capacitor reaches a value determined by the turn-on reference signal;

wherein the turn-on element is coupled to the second terminal of the bootstrap capacitor and to the input terminal of the limiting stage.

10. The voltage generator-booster as recited in claim 9, wherein the turn-on element comprises:

first and second turn-on transistors coupled to the limiting circuit, the first turn-on transistor having a control terminal coupled to the second terminal of the bootstrap capacitor, the second turn-on transistor having a control terminal that defines the input terminal of the limiting stage.

11. The voltage generator-booster as recited in claim 8, wherein the pulse amplitude preset stage comprises:

a voltage setting circuit having a first reference terminal to receive the first reference potential and a second reference terminal to receive a second reference potential, the voltage setting circuit including a plurality of constant-voltage-drop elements coupled in series to one another and a resistive element coupled between the plurality of constant-voltage-drop elements and the first reference terminal.

12. The voltage generator-booster as recited in claim 11, wherein each of the constant-voltage-drop elements includes a diode-connected transistor, and the resistive element includes a MOS transistor.

13. The voltage generator-booster as recited in claim 8, wherein the bootstrap control stage comprises:

first and second decoupling transistors coupled together to operate in a push-pull manner, the first decoupling transistor being coupled to the second terminal of the bootstrap capacitor and a second reference terminal to receive a second reference potential and having a first control terminal coupled to the pump input terminal, the second decoupling transistor being coupled to the pump input and the second terminal of the bootstrap capacitor and having a second control terminal coupled to the first terminal of the bootstrap capacitor.

14. The voltage generator-booster as recited in claim 13, wherein the first and second decoupling transistors are of a same type; and wherein the bootstrap control stage further includes an inverting element coupled to the pump input terminal and the second decoupling transistor.

15. The voltage generator-booster as recited in claim 14, wherein the first and second decoupling transistors are N-channel MOS transistors.

16. The voltage generator-booster as recited in claim 8, wherein the precharge limiting means comprises:

a precharge transistor having a first terminal coupled to the first reference terminal, a second terminal coupled to the first terminal of the bootstrap capacitor and a control terminal to receive the precharge reference signal $V_{UP}$.

17. The voltage generator-booster as recited in claim 16, wherein the limiting stage comprises:

a limiting circuit coupled between the first terminal of the bootstrap capacitor and a second reference terminal to receive a second reference potential;

an input terminal to receive the turn-on reference signal $V_{LC}$; and a turn-on element coupled to the limiting circuit to turn on the limiting circuit when a voltage at the second terminal of the bootstrap capacitor reaches a value determined by the turn-on reference signal;

wherein the turn-on element is coupled to the second terminal of the bootstrap capacitor and to the input terminal of the limiting stage.

18. The voltage generator-booster as recited in claim 17, wherein the turn-on element comprises:

first and second turn-on transistors coupled to the limiting circuit, the first turn-on transistor having a control terminal coupled to the second terminal of the bootstrap capacitor, the second turn-on transistor having a control terminal that defines the input terminal of the limiting stage.

19. The voltage generator-booster as recited in claim 16, wherein the pulse amplitude preset stage comprises:

a voltage setting circuit having a first reference terminal to receive the first reference potential and a second reference terminal to receive a second reference potential, the voltage setting circuit including a plurality of constant-voltage-drop elements coupled in series to one another and a resistive element coupled between the plurality of constant-voltage-drop elements and the first reference terminal.

20. The voltage generator-booster as recited in claim 19, wherein each constant-voltage-drop element includes a diode-connected transistor, and the resistive element includes a MOS transistor.

21. The voltage generator-booster as recited in claim 16, wherein the precharge transistor is a native MOS transistor.

22. A voltage generator-booster for supplying an output voltage from a variable supply voltage, the output voltage being at one of a first and second approximately constant voltage levels, the voltage generator-booster comprising:

a charge storage device having a first terminal to provide the output voltage and a second terminal;

a precharge circuit having an input terminal to receive the variable supply voltage and an output, coupled to the first terminal of the charge storage device, that provides a voltage to the charge storage device that varies little with respect to variations of a value of the variable supply voltage so as to provide the output voltage at the first approximately constant voltage level; and limiting means, coupled to the charge storage device, for limiting the output voltage at the first terminal of the charge storing device when a voltage at the second terminal exceeds a predetermined threshold value so that the first terminal of the charge storage device provides the output voltage at the second approximately constant voltage level.

23. The voltage generator-booster as recited in claim 22, wherein the limiting means comprises:

a limiting circuit coupled to the first terminal of the charge storage device and a first reference potential; and a turn-on element, coupled to the limiting circuit, and coupled to the charge storage device at the second terminal, the turn-on element to turn on the limiting circuit when the voltage at the second terminal exceeds the predetermined threshold.

24. The voltage generator booster as recited in claim 22 wherein the charge storage device includes a capacitor.

25. The voltage generator booster as recited in claim 22, further comprising:

a bootstrap control circuit to continuously alternately couple and decouple the second terminal of the charge storage device to a first reference terminal to receive a first reference potential.

26. The voltage generator-booster as recited in claim 25, wherein the bootstrap control circuit comprises:

an inverter to invert a pump signal and output an inverted pump signal;

a first transistor to receive the pump signal at a control terminal, a first terminal of the first transistor coupled to the second terminal of the charge storage device and a second terminal of the first transistor coupled to receive the first reference potential; and a second transistor to receive the inverted pump signal at a first terminal thereof, a control terminal of the second transistor coupled to the first terminal of the charge storage device and a second terminal of the second transistor coupled to the second terminal of the charge storage device.

27. The voltage generator booster as recited in claim 22, further comprising:

a second pulse amplitude circuit, coupled to the limiting means, to provide a turn-on reference signal to the limiting means;

wherein the limiting means limits the voltage at the first terminal as a function of the turn-on reference signal.

28. The voltage generator-booster as recited in claim 27, wherein the precharge circuit comprises:

a precharge transistor with a first terminal to receive the variable supply voltage, a second terminal coupled to the first terminal of the charge storage device; and a control terminal to receive the precharge reference signal.

29. The voltage generator-booster as recited in claim 22, further comprising:

a first pulse amplitude presetting circuit to provide a precharge reference signal to the precharge circuit;

wherein the precharge circuit limits the provided precharge voltage as a function of the precharge reference signal.

30. The voltage generator-booster as recited in claim 29, wherein the precharge circuit comprises:

a precharge transistor with a first terminal to receive the variable supply voltage, a second terminal coupled to the first terminal of the charge storage device; and a control terminal to receive the precharge reference signal.

31. The voltage generator-booster as recited in claim 29, wherein the pulse amplitude presetting circuit comprises:

a voltage setting circuit, having a terminal to receive the variable supply voltage, the voltage setting circuit including a plurality of constant-voltage-drop elements coupled in series to one another and a resistive element coupled between the plurality of constant-voltage-drop elements and the variable supply voltage terminal.

32. A method for supplying an output voltage at one of a first and second approximately constant voltages value from a variable supply voltage, the method comprising the steps of:

providing a precharge voltage to a first terminal of a charge storage device to provide the output voltage at the first approximately constant voltage value, the precharge voltage having a value that varies little with respect to variations of a value of the variable supply voltage; and limiting the output voltage at the first terminal of the charge storage device when a voltage at a second terminal of the charge storage device exceeds a predetermined threshold value so that the first terminal provides the output voltage at the second approximately constant voltage value.

33. The method as recited in claim 32, further comprising the step of:

continuously alternately coupling and decoupling the second terminal of the charge storage device to a first reference potential line.

34. The method as recited in claim 32, further comprising the step of:

limiting the provided precharge voltage to a value determined by a precharge reference signal.

35. The method as recited in claim 32, wherein the step of limiting the voltage at the first terminal of the charge storage devices includes:

coupling a limiting circuit branch between the first terminal of the charge storage device and a first reference potential line.

36. A voltage generator for supplying an output voltage at one of a first and second approximately constant voltage levels that vary little with respect to variations of a supply voltage level, the voltage generator comprising:

a precharge limiting circuit to provide a voltage having a value that varies little with respect to variations of the supply voltage, to a first terminal of a charge storage device when a second terminal of the charge storage device is coupled to a first reference terminal to receive a first reference potential, the first terminal of the charge storage device to provide the output voltage at the first approximately constant voltage level; and pull-up limiting means for limiting the output voltage at the first terminal of the charge storage device when a voltage at the second terminal of the charge storage device exceeds a predetermined value so that the first terminal of the charge storage device provides the output voltage at the second approximately constant voltage level.

37. The voltage generator as recited in claim 36, further comprising:

a reference providing circuit for providing a precharge reference voltage $V_{UP}$ to the precharge limiting circuit;

wherein the precharge limiting circuit limits the provided voltage according to the precharge reference voltage $V_{UP}$.

38. The voltage generator as recited in claim 36, further comprising:

a reference providing circuit for providing a turn on reference voltage $V_{LC}$ to the pull-up limiting means;

wherein the pull-up limiting means limits the voltage at the first terminal according to the turn-on reference voltage $V_{LC}$.

39. The voltage generator as recited in claim 38, wherein:

the reference providing circuit includes a circuit to provide a precharge reference voltage $V_{UP}$ to the precharge limiting circuit; and wherein the precharge limiting circuit limits the provided voltage according to the precharge reference voltage $V_{UP}$.

40. A voltage generator for generating an output voltage at one of a first and second approximately constant voltage values, the voltage generator comprising:

a charge storage device including a first terminal and a second terminal, the first terminal to provide the output voltage;

a precharge circuit to provide a predetermined precharge voltage to the first terminal of the charge storage device that varies little with respect to variations of a value of a supply voltage so as to provide the output voltage at the first approximately constant voltage value; and a limiting circuit, coupled to the charge storage device, to limit the output voltage at the first terminal of the charge storage device when a second voltage at the second terminal of the charge storage device exceeds a predetermined threshold value so that the first terminal of the charge storage device provides the output voltage at the second approximately constant voltage value.

41. The voltage generator as recited in claim 40, further comprising:

a bootstrap control circuit to continuously alternately couple and decouple the second terminal of the charge storage device to a first reference potential line.

42. The voltage generator as recited in claim 41, further comprising:

a pulse amplitude presetting circuit to provide a precharge reference signal to the precharge circuit and a turn-on reference signal to the limiting circuit;

wherein the precharge circuit limits the provided precharge voltage as a function of the precharge reference signal and the limiting circuit limits the voltage at the first terminal as a function of the turn-on reference signal.

* * * * *